(12) United States Patent
Pang

(10) Patent No.: US 11,919,557 B2
(45) Date of Patent: Mar. 5, 2024

(54) FOLDING WAGON WITH FOLDING TABLE

(71) Applicant: Qingdao Zhengtao Tool CO., LTD, Qingdao (CN)

(72) Inventor: Wei Pang, Qingdao (CN)

(73) Assignee: QINGDAO ZHENGTAO TOOL CO., LTD, Qingdao (CN)

( * ) Notice: Subject to any disclaimer, the term of this patent is extended or adjusted under 35 U.S.C. 154(b) by 73 days.

(21) Appl. No.: 17/657,350

(22) Filed: Mar. 30, 2022

(65) Prior Publication Data

US 2023/0192167 A1 Jun. 22, 2023

(30) Foreign Application Priority Data

Dec. 18, 2021 (CN) .......................... 202123188381.5

(51) Int. Cl.
*B62B 3/02* (2006.01)
*B62B 5/00* (2006.01)

(52) U.S. Cl.
CPC ................ *B62B 3/025* (2013.01); *B62B 5/00* (2013.01)

(58) Field of Classification Search
CPC .............................. A47B 3/0818; A47B 3/083
See application file for complete search history.

(56) References Cited

U.S. PATENT DOCUMENTS

| 9,101,206 | B1* | 8/2015 | Chen ....................... B62B 3/007 |
| 9,145,154 | B1* | 9/2015 | Horowitz .............. B62B 5/0013 |
| 9,440,668 | B1* | 9/2016 | Chen .................... B62B 5/0013 |
| 9,623,890 | B1* | 4/2017 | Horowitz ................ B62B 3/007 |
| 9,731,779 | B2* | 8/2017 | Lamb ................... B62D 51/001 |
| 9,738,298 | B1* | 8/2017 | Yang ...................... B62B 3/025 |
| 9,855,962 | B1* | 1/2018 | Chen ....................... B62B 3/025 |
| 9,950,727 | B1* | 4/2018 | Pang ...................... B62B 3/025 |
| 10,988,153 | B1* | 4/2021 | Horowitz ............... B62B 7/008 |

(Continued)

FOREIGN PATENT DOCUMENTS

| DE | 102018117293 A1 * | 1/2019 | ............ B62B 3/001 |
| DE | 202020102798 U1 * | 7/2020 | |

(Continued)

OTHER PUBLICATIONS

Translated DE-202020102798-U1 (Year: 2023).*
Translated KR-20160093868-A (Year: 2023).*

*Primary Examiner* — James A Shriver, II
*Assistant Examiner* — Ian Bryce Shelton
(74) *Attorney, Agent, or Firm* — Bayramoglu Law Offices LLC

(57) ABSTRACT

A folding wagon with a folding table is provided and includes a first main frame and a second main frame. Positions at front and rear ends of the bottom of the first main frame are respectively fixedly connected to front brackets, tops of the two front brackets are provided with a connecting rod, and each of the bottoms of the two front brackets is rotatably connected to a front caster. A brake assembly passes through and is arranged at a position between the bottoms of the two front brackets, and positions adjacent to the bottom of the first main frame are respectively rotatably connected to first outer frames. In the folding wagon, the detachable connecting rod is provided on the two front brackets, which can be freely modified. In the connected state, the two front casters are controlled to turn left or right at the same time by a handle.

8 Claims, 4 Drawing Sheets

(56) References Cited

U.S. PATENT DOCUMENTS

| | | | |
|---|---|---|---|
| 2010/0090444 A1* | 4/2010 | Chen | B62B 3/106 |
| | | | 280/651 |
| 2011/0079972 A1* | 4/2011 | Watson | B62B 3/007 |
| | | | 280/47.35 |
| 2016/0121943 A1* | 5/2016 | Lamb | B62B 5/0033 |
| | | | 180/19.3 |
| 2018/0153302 A1* | 6/2018 | Jiang | A47B 95/00 |
| 2018/0297622 A1* | 10/2018 | Chen | B62B 3/007 |
| 2020/0029684 A1* | 1/2020 | Jiang | A47B 97/00 |
| 2020/0031376 A1* | 1/2020 | Horowitz | B62B 3/025 |
| 2020/0283046 A1* | 9/2020 | Wu | B62B 3/007 |
| 2022/0089207 A1* | 3/2022 | Gavin | B62B 3/025 |

FOREIGN PATENT DOCUMENTS

| | | | |
|---|---|---|---|
| KR | 101623353 B1 * | 8/2016 | |
| KR | 20160093868 A * | 8/2016 | |

\* cited by examiner

FOLDING WAGON WITH FOLDING TABLE

CROSS REFERENCE TO THE RELATED APPLICATIONS

This application is based upon and claims priority to Chinese Patent Application No. 202123188381.5, filed on Dec. 18, 2021, the entire contents of which are incorporated herein by reference.

TECHNICAL FIELD

The present invention relates to the technical field of folding wagon, and more particularly, to a folding wagon with a folding table.

BACKGROUND

A folding wagon is generally composed of a wagon frame folding joint and a stand rod folding joint. By folding the wagon frame, the front and rear casters are folded together so that the length of the wagon can be reduced by approximately 45%. Thus, after being folded, the whole wagon can be put into the boarding chassis and folding bag, as well as the trunk of a car. In the process of folding, the wagon can be folded and unfolded manually without a requirement to use external tools, and after folding, the seat rod can be configured as a support point for stably standing after folding.

Presently, the usage of folding wagons in the market is more tedious, for example, the relatively troublesome folding results in a time-consuming folding work; the troublesome movement causes an inconvenience when used since most folding wagons can only be moved in one direction when being moved.

SUMMARY

An objective of the present invention is to provide a folding wagon with a folding table to solve the defects existing in the prior art.

In order to achieve the above objective, the present invention adopt the following technical solutions: a folding wagon with a folding table includes a first main frame and a second main frame, where positions at front and rear ends of the bottom of the first main frame are respectively fixedly connected to front brackets, tops of the two front brackets are provided with a connecting rod, and each of the bottoms of the two front brackets is rotatably connected to a front caster; a brake assembly passes through and is arranged at a position between the bottoms of the two front brackets, positions adjacent to the bottom of the first main frame are respectively rotatably connected to first outer frames, positions at left sides of the two first outer frames are each rotatably connected to a first bottom frame; positions adjacent to the bottom of the second main frame are respectively rotatably connected to second outer frames, and positions at the bottoms of the second outer frames are each rotatably connected to a second bottom frame; positions adjacent to the top of the first main frame are respectively rotatably connected to first rotating plates, a first inner frame is rotatably connected between one ends of the two first rotating plates; positions adjacent to the top of the second main frame are respectively rotatably connected to second rotating plates, and a second inner frame is rotatably connected between the two second rotating plates; the positions at the top of the first main frame are rotatably connected to first top frames, a first table is fixedly connected between the first top frames, positions at one ends of the first top frames are rotatably connected to second top frames, and a second table is fixedly connected between the second top frames; a position at the top of a right side of the second main frame is fixedly connected to a clamping device; positions adjacent to two ends of the bottom of the second main frame are respectively fixedly connected to second connecting plates, and positions at the right sides of the bottoms of the two second connecting plates are respectively fixedly connected to rear brackets; each of the bottoms of the two rear brackets is rotatably connected to a rear caster, and the position at the middle of the bottom of the second main frame is fixedly connected to a first connecting plate; a position at a right side of the top of the first connecting plate is rotatably connected to a rotating block, and a position at a right side of the rotating block is fixedly connected to a pull rod; the positions adjacent to the top of an outer side of the first main frame are respectively fixedly connected to a strap, the strap is respectively fixedly connected to an inner lock buckle and an outer lock buckle, and the inner lock buckle and the outer lock buckle are buckled with each other; right ends of the second top frames are located at the top of the second main frame in an unfolded state, and positions at left sides of the two first top frames are respectively fixedly connected to plastic locking buckles.

As a further description of the above technical solutions: the two second outer frames are respectively rotatably connected to positions at right ends of inner sides of the first outer frames.

As a further description of the above technical solutions: a position at an inner side of one end of the second bottom frame is rotatably connected to an outer side of one end of the first bottom frame.

As a further description of the above technical solutions: a position at the middle of an inner side of the two first outer frames is rotatably connected to a position at the middle of an outer side of the first inner frame in a cross arrangement.

As a further description of the above technical solutions: a position at the bottom of the first inner frame is rotatably connected to a position at an outer side of one end of the second bottom frame.

As a further description of the above technical solutions: a position at the middle of an outer side of the two second outer frames is rotatably connected to a position at the middle of an inner side of the second inner frame, and the second outer frames are crossed with the second inner frame.

As a further description of the above technical solutions: a position at an inner side of one end of the second inner frame is rotatably connected to a position at an outer side of one end of the first inner frame.

As a further description of the above technical solutions: positions at the outer sides of one ends of the two second outer frames are respectively rotatably connected to positions at the inner sides of one ends of the first outer frames.

The advantages of the present invention are as follows:

1. In the present invention, firstly the first table and the second table are a half-folded structure, adopting the combination of steel frame and wood plate, specifically, when being used, the tables can be unfolded and placed on the front beam of the wagon body to form a flat table, which can expand the usage occasion and space and protect against rain and sun. When not being used, the table is folded and hung at the rear end of the wagon, and the two plastic locking buckles are respectively located at the positions at the right ends of the second top frames in the folded state, so that the first top frames and the second top frames can be fixed together. Moreover, the outer lock buckle and the inner lock buckle on the wagon frame are buckled with each other, and simultaneously, the tables and the main frame body can be further fixed together by the strap so that the two tables can be more firmly fixed. The brake assembly, which can simultaneously brake the two front casters, is arranged between the front brackets of the two front casters, and simultaneously braking the two front casters by one foot through one connecting rod can be achieved. At the same time, the device can avoid the four casters from being folded into a straight line, which solves the problem of not being able to stand independently after being folded, and makes it simpler and easier for the folding wagon to unfold, fold and stand.

2. In the present invention, the detachable connecting rod is provided on the two front brackets, which can be freely modified. In the connected state, the two front casters are controlled to turn left or right at the same time by a handle; in the unconnected state, the two front casters can rotate 360 degrees, and the pull rod can adjust the front and rear positions by the rotating block. When not being used, the pull rod can be pushed forward to the inside of the clamping device, and the clamping device tightly locks the pull rod to avoid slipping.

REFERENCE NUMBER

Figure 1:
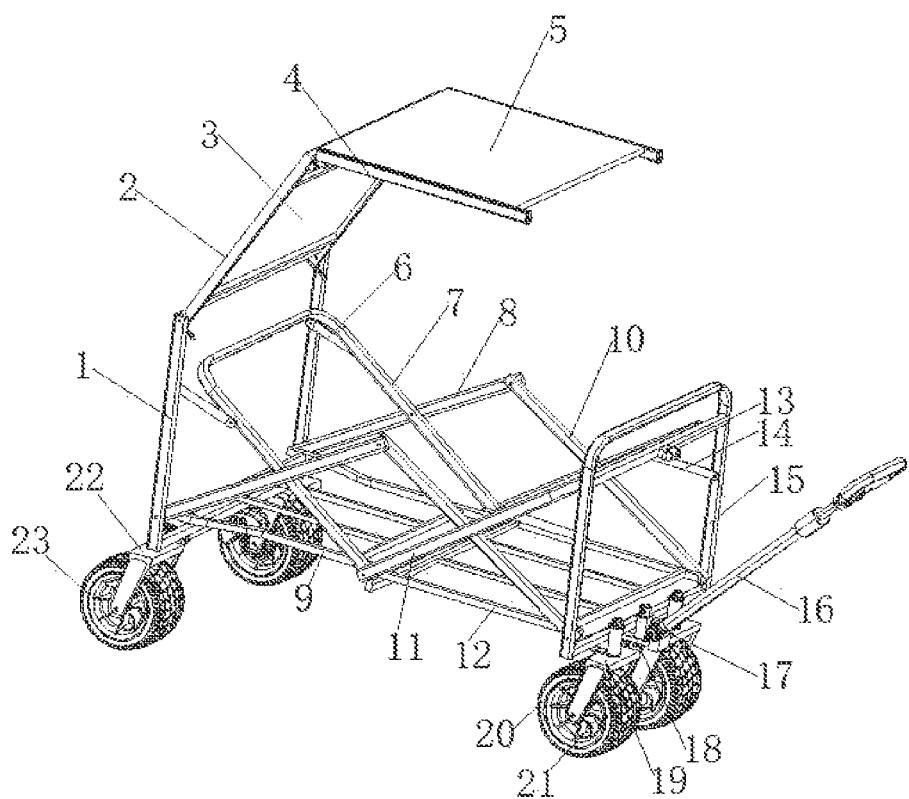
FIG. 1 is a schematic diagram of a folding wagon with a folding table in an unfolding state according to the present invention.

1—first main frame; 2—first top frame; 3—first table; 4—second top frame; 5—second table; 6—first rotating plate; 7—first inner frame; 8—first outer frame; 9—first bottom frame; 10—second outer frame; 11—second inner frame; 12—second bottom frame; 13—clamping device; 14—second rotating plate; 15—second main frame; 16—pull rod; 17—rotating block; 18—first connecting plate; 19—rear bracket; 20—second connecting plate; 21—rear caster; 22—front bracket; 23—front caster; 24—connecting rod; 25—brake assembly; 26—strap; 27—outer lock buckle; 28—inner lock buckle; 29—plastic locking buckle.

DETAILED DESCRIPTION OF THE EMBODIMENTS

The technical solutions in the embodiments of the present invention will be clearly and completely described below in conjunction with the drawings in the embodiments of the present invention. Apparently, the described embodiments is only part of the embodiments of the present invention, not all embodiments. Based on the embodiments of the present invention, all other embodiments obtained by the ordinary skilled in the art without creative work shall fall within the scope of protection of the present invention.

In the description of the present invention, it should be noted that the orientation or position relations indicated by the terminologies "center", "upper", "lower", "left", "right", "vertical", "horizontal", "inside" and "outside" are based on the orientation or position relations shown in the drawings, only for facilitating to describe the present invention and simplifying the description and rather than indicating or implying that the device or element referred to must have a specific orientation and be constructed and operated in a specific direction. Therefore, they cannot be understood as a limitation to the present invention. The terminologies "first", "second" and "third" are configured only for descriptive purposes and cannot be understood to indicate or imply relative importance. In addition, unless otherwise clearly specified and defined, the terminologies "installation", "connected" and "connection" should be understood in a broad sense, for example, it may be a fixed connection, a detachable connection, or an integrated connection; it may be a mechanical connection or an electrical connection; it may be a direct connection, an indirect connection through an intermediary, or an internal connection of two elements. For the ordinary skilled in the art, the specific significance of the above terminologies in the present invention can be understood in specific circumstances.

Figure 2:
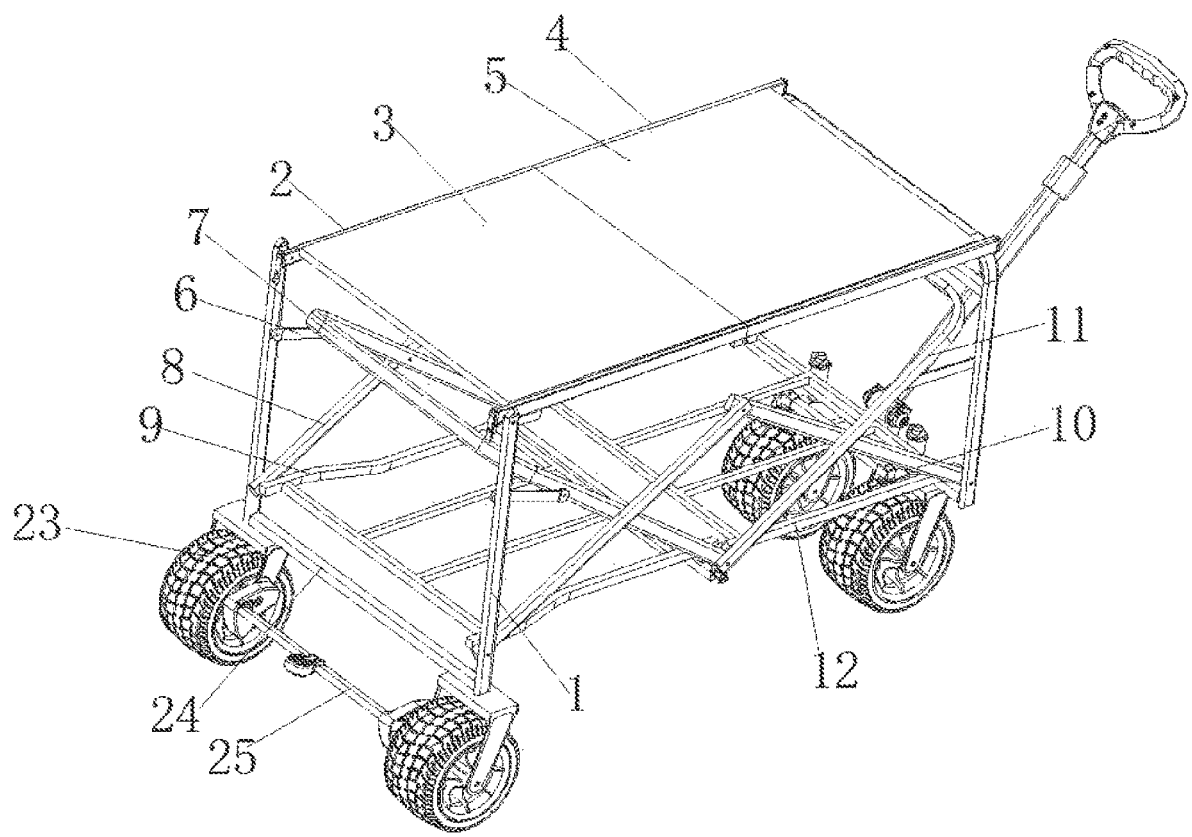
FIG. 2 is a perspective diagram of the folding wagon with the folding table according to the present invention.
Figure 3:
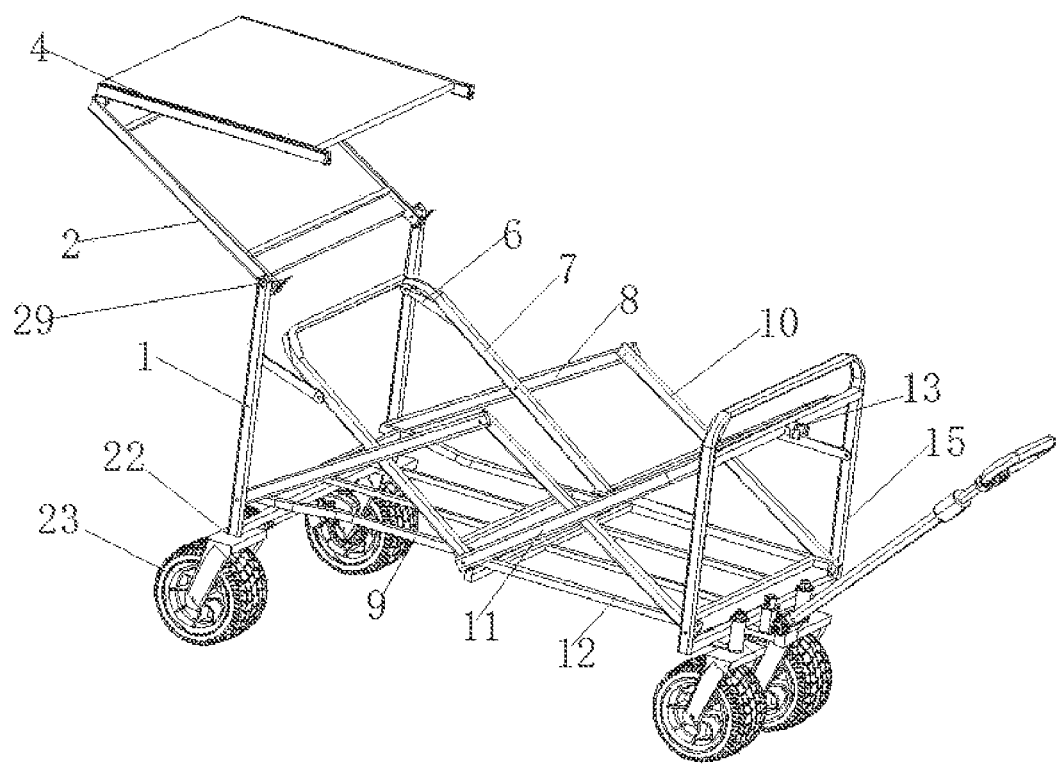
FIG. 3 is a detailed internal structure diagram of the folding wagon with the folding table according to the present invention.
Figure 4:
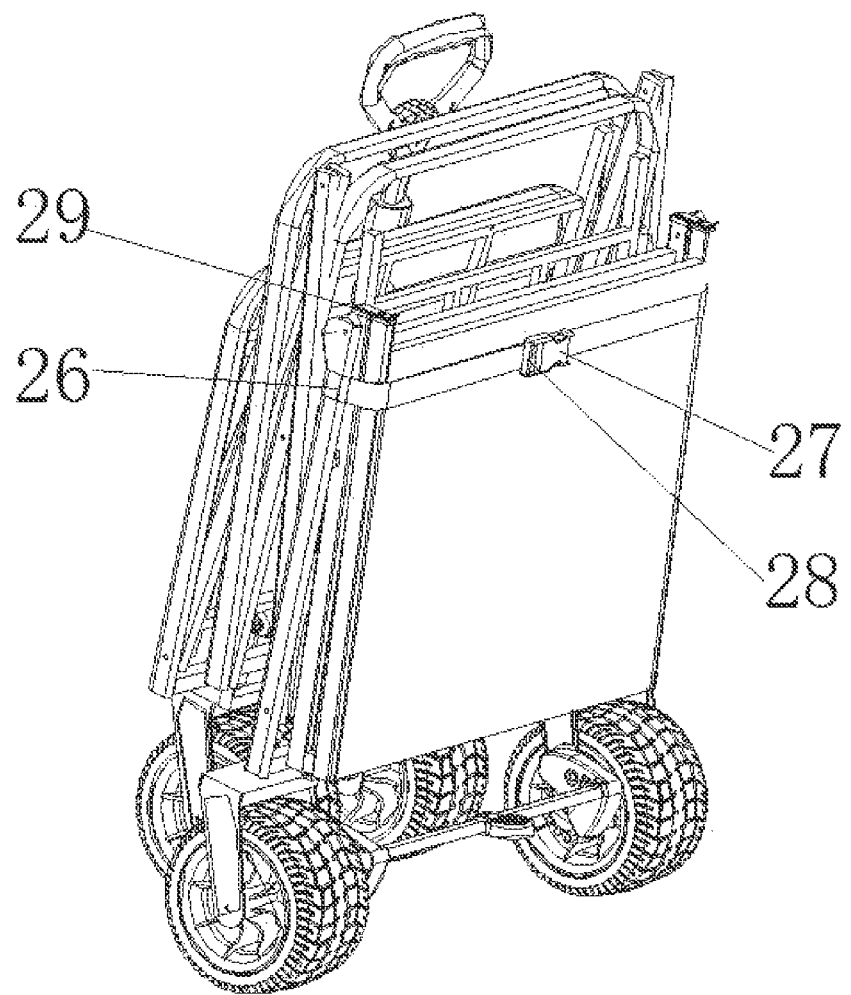
FIG. 4 is a schematic diagram of the folding wagon with the folding table in a folding state according to the present invention.

Referring to FIGS. 1 to 4, in an embodiment provided by the present invention, a folding wagon with a folding table includes the first main frame 1 and the second main frame 15. The positions at the front and rear ends of the bottom of the first main frame 1 are respectively fixedly connected to the front brackets 22, the tops of the two front brackets 22 are provided with the connecting rod 24, and each of the bottoms of the two front brackets 22 is rotatably connected to the front caster 23. The brake assembly 25 passes through and is arranged at the position between the bottoms of the two front brackets 22, the positions adjacent to the bottom of the first main frame 1 are respectively rotatably connected to the first outer frames 8, the positions at the left sides of the two first outer frames 8 are each rotatably connected to the first bottom frame 9. The positions adjacent to the bottom of the second main frame 15 are respectively rotatably connected to the second outer frames 10, and the positions at the bottoms of the second outer frames 10 are each rotatably connected to the second bottom frame 12. The positions adjacent to the top of the first main frame 1 are respectively rotatably connected to the first rotating plates 6, and the first inner frame 7 is rotatably connected between one ends of the two first rotating plates 6. The positions adjacent to the top of the second main frame 15 are respectively rotatably connected to the second rotating plates 14, and the second inner frame 11 is rotatably connected between the two second rotating plates 14. The positions at the top of the first main frame 1 are rotatably connected to the first top frames 2, the first table 3 is fixedly connected between the first top frames 2, the positions at one ends of the first top frames 2 are rotatably connected to the second top frames 4, and the second table 5 is fixedly connected between the second top frames 4. The position at the top of the right side of the second main frame 15 is fixedly connected to the clamping device 13. The positions adjacent to the two ends of the bottom of the second main frame 15 are respectively fixedly connected to the second connecting plates 20, and the positions at the right sides of the bottoms of the two second connecting plates 20 are respectively fixedly connected to the rear brackets 19. Each of the bottoms of the two rear brackets 19 is rotatably connected to the rear caster 21, and the position at the middle of the bottom of the second main frame 15 is fixedly connected to the first connecting plate 18. The position at the right side of the top of the first connecting plate 18 is rotatably connected to the rotating block 17, and the position at the tight side of the rotating block 17 is fixedly connected to the pull rod 16. The positions adjacent to the top of the outer side of the first main frame 1 are respectively fixedly connected to the strap 26, the strap 26 is respectively fixedly connected to the inner lock buckle 28 and the outer lock buckle 27, and the inner lock buckle 28 and the outer lock buckle 27 are buckled with each other. The tight ends of the second top frames 4 are located at the top of the second main frame 15 in the unfolded state, the positions at the left sides of the two first top frames 2 are respectively fixedly connected to the plastic locking buckles 29, and the first table 3 and the second table 5 are a half-folded structure, adopting the combination of steel frame and wood plate; specifically, when being used, the tables can be unfolded and placed on the front beam of the wagon body to form a flat table, which can expand the usage occasion and space and protect against rain and sun. When not being used, the table is folded and hung at the rear end of the wagon, and the two plastic locking buckles 29 are respectively located at the positions at the right ends of the second top frames 4 in the folded state, so that the first top frames 2 and the second top frames 4 can be fixed together. Moreover, the outer lock buckle 27 and the inner lock buckle 28 on the wagon frame are buckled with each other, and simultaneously, the tables and the main frame body can be further fixed together by the strap 26, so that the two tables can be more firmly fixed. The brake assembly 25, which can simultaneously brake the two front casters 23, is arranged between the front brackets 22 of the two front casters 23, and simultaneously braking the two front casters 23 by one foot through one connecting rod can be achieved. At the same time, the device can avoid the four casters from being folded into a straight line, which solves the problem of not being able to stand on their own after being folded, and makes it simpler and easier for the folding wagon to unfold, fold and stand.

The two second outer frames 10 are respectively rotatably connected to the positions at the right ends of the inner sides of the first outer frames 8, the position at the inner side of one end of the second bottom frame 12 is rotatably connected to the outer side of one end of the first bottom frame 9, the position at the middle of the inner side of the two first outer frames 8 is rotatably connected to the position at the middle of the outer side of the first inner frame 7 in a cross arrangement, and the position at the bottom of the first inner frame 7 is rotatably connected to the position at the outer side of one end of the second bottom frame 12. The position at the middle of the outer side of the two second outer frames 10 is rotatably connected to the position at the middle of the inner side of the second inner frame 11, the second outer frames 10 are crossed with the second inner frame 11, the position at the inner side of one end of the second inner frame 11 is rotatably connected to the position at the outer side of one end of the first inner frame 7, and the positions at the outer sides of one ends of the two second outer frames 10 are respectively rotatably connected to the positions at the inner sides of one ends of the first outer frames 8. The detachable connecting rod 24 is provided on the two front brackets 22, which can be freely modified. In the connected state, the two front casters are controlled to turn left or right at the same time by a handle; in the unconnected state, the two front casters can rotate 360 degrees, and the pull rod 16 can adjust the front and rear positions by the rotating block 17. When not being used, the pull rod 16 can be pushed forward to they inside of the clamping device 13, and the clamping device 13 tightly locks the pull rod 16 to avoid slipping.

Working principle: the first table 3 and the second table 5 are a half-folded structure, adopting the combination of steel frame and wood plate, specifically, when being used, the tables can be unfolded and placed on the front beam of the wagon body to form a flat table, which can expand the usage occasion and space, and protect against rain and sun. When not being used, the table is folded and hung at the rear end of the wagon, and the two plastic locking buckles 29 are respectively located at the positions at the right ends of the second top frames 4 in the folded state, so that the first top frames 2 and the second top frames 4 can be fixed together. Moreover, the outer lock buckle 27 and the inner lock buckle 28 on the wagon frame are buckled with each other, and simultaneously, the tables and the main frame body can be further fixed together by the strap 26, so that the two tables can be more firmly fixed. The brake assembly 25, which can simultaneously brake the two front casters 23, is arranged between the front brackets 22 of the two front casters 23, and simultaneously braking the two front casters 23 by one foot through one connecting rod can be achieved. At the same time, the device can avoid the four casters from being folded into a straight line, which solves the problem of not being able to stand on their own after being folded, and makes it simpler and easier for the folding wagon to unfold, fold and stand. The detachable connecting rod 24 is provided on the two front brackets 22, which can be freely modified. In the connected state, the two front casters are controlled to turn left or tight at the same time by a handle; in the unconnected state, the two front casters can rotate 360 degrees, and the pull rod 16 can adjust the front and rear positions by the rotating block 17. When not being used, the pull rod 16 can be pushed forward to the inside of the clamping device 13, and the clamping device 13 tightly locks the pull rod 16 to avoid slipping.

Finally, it should be noted that the above are only the preferred embodiments of the present invention and are not used to limit the present invention. Whereas the present invention is described in detail with reference to the above embodiments, for the skilled in the art, the technical solutions recorded in the above embodiments can still be modified, or some of the technical features can be replaced equally. Any modification, equivalent replacement, improvement, and the like made within the spirit and principles of the present invention shall fall within the scope of protection of the present invention.

What is claimed is:

1. A folding wagon with a folding table, comprising a first main frame and a second main frame, wherein
    positions at front and rear ends of a bottom of the first main frame are respectively fixedly connected to two front brackets, tops of the two front brackets are provided with a connecting rod, and each of bottoms of the two front brackets is rotatably connected to a front caster;
    a brake assembly passes through and is arranged at a position between the bottoms of the two front brackets, positions adjacent to the bottom of the first main frame are respectively rotatably connected to two first outer frames, positions at left sides of the two first outer frames are each rotatably connected to a first bottom frame;
    positions adjacent to a bottom of the second main frame are respectively rotatably connected to two second outer frames, and positions at bottoms of the two second outer frames are each rotatably connected to a second bottom frame;

positions adjacent to a top of the first main frame are respectively rotatably connected to two first rotating plates, a first inner frame is rotatably connected between ends of the two first rotating plates;

positions adjacent to a top of the second main frame are respectively rotatably connected to two second rotating plates, and a second inner frame is rotatably connected between the two second rotating plates;

positions at the top of the first main frame are rotatably connected to two first top frames, a first table is fixedly connected between the two first top frames, positions at ends of the two first top frames are rotatably connected to two second top frames, and a second table is fixedly connected between the two second top frames, wherein the first table and the second table are placed on a front beam of the wagon body to form a flat table in an unfolded state, and the first table and the second table are hung at the rear end of the wagon in a folded state;

a position at a top of a right side of the second main frame is fixedly connected to a clamping device;

positions adjacent to two ends of the bottom of the second main frame are respectively fixedly connected to two second connecting plates, and positions at right sides of bottoms of the two second connecting plates are respectively fixedly connected to two rear brackets;

each of bottoms of the two rear brackets is rotatably connected to a rear caster, and a position at a middle of the bottom of the second main frame is fixedly connected to a first connecting plate;

a position at a right side of a top of the first connecting plate is rotatably connected to a rotating block, and a position at a right side of the rotating block is fixedly connected to a pull rod;

positions adjacent to a top of an outer side of the first main frame are respectively fixedly connected to a strap, the strap is respectively fixedly connected to an inner lock buckle and an outer lock buckle, and the inner lock buckle and the outer lock buckle are buckled with each other to fix the two tables and the main frame body together in the folded state; and right ends of the two second top frames are located at the top of the second main frame in the unfolded state, and positions at left sides of the two first top frames are respectively fixedly connected to plastic locking buckles to fix the first top frames and the second top frames together.

2. The folding wagon with a folding table according to claim 1, wherein the two second outer frames are respectively rotatably connected to positions at right ends of inner sides of the two first outer frames.

3. The folding wagon with a folding table according to claim 1, wherein a position at an inner side of one end of the second bottom frame is rotatably connected to an outer side of one end of the first bottom frame.

4. The folding wagon with a folding table according to claim 1, wherein a position at a middle of an inner side of each of the two first outer frames is rotatably connected to a position at a middle of an outer side of the first inner frame in a cross arrangement.

5. The folding wagon with a folding table according to claim 1, wherein a position at a bottom of the first inner frame is rotatably connected to a position at an outer side of one end of the second bottom frame.

6. The folding wagon with a folding table according to claim 1, wherein a position at a middle of an outer side of each of the two second outer frames is rotatably connected to a position at a middle of an inner side of the second inner frame, and the two second outer frames are crossed with the second inner frame.

7. The folding wagon with a folding table according to claim 1, wherein a position at an inner side of one end of the second inner frame is rotatably connected to a position at an outer side of one end of the first inner frame.

8. The folding wagon with the folding table according to claim 1, wherein positions at outer sides of ends of the two second outer frames are respectively rotatably connected to positions at inner sides of ends of the two first outer frames.

* * * * *